United States Patent
Salli et al.

(10) Patent No.: US 9,323,680 B1
(45) Date of Patent: Apr. 26, 2016

(54) METHOD AND APPARATUS FOR PREFETCHING DATA

(75) Inventors: Tommi Salli, Mountain View, CA (US); Hans Van Rietschote, Sunnyvale, CA (US); Craig W. Hobbs, Mountain View, CA (US)

(73) Assignee: Veritas US IP Holdings LLC, Mountain View, CA (US)

( * ) Notice: Subject to any disclaimer, the term of this patent is extended or adjusted under 35 U.S.C. 154(b) by 1292 days.

(21) Appl. No.: 11/864,716

(22) Filed: Sep. 28, 2007

(51) Int. Cl.
*G06F 15/16* (2006.01)
*G06F 12/08* (2006.01)
*H04N 21/234* (2011.01)
*H04L 29/06* (2006.01)

(52) U.S. Cl.
CPC .... *G06F 12/0862* (2013.01); *G06F 2212/6026* (2013.01); *G06F 2212/6028* (2013.01); *H04L 65/4069* (2013.01); *H04N 21/23406* (2013.01)

(58) Field of Classification Search
CPC ............ H04L 65/4069; G06F 12/0862; G06F 2212/6026; G06F 2212/6028; H04N 21/23406
USPC ................................................. 709/219, 231
See application file for complete search history.

(56) References Cited

U.S. PATENT DOCUMENTS

| | | | | |
|---|---|---|---|---|
| 5,822,790 A * | 10/1998 | Mehrotra | ...................... | 711/213 |
| 5,941,981 A * | 8/1999 | Tran | ............... | 712/207 |
| 6,055,621 A * | 4/2000 | Puzak | ........................... | 712/207 |
| 6,073,215 A * | 6/2000 | Snyder | .......................... | 711/137 |
| 6,088,705 A * | 7/2000 | Lightstone et al. | ........... | 707/200 |
| 6,311,221 B1 * | 10/2001 | Raz et al. | ....................... | 709/231 |
| 6,529,998 B1 * | 3/2003 | Yochai et al. | .................. | 711/137 |
| 6,728,726 B1 * | 4/2004 | Bernstein et al. | | |
| 6,728,840 B1 | 4/2004 | Shatil et al. | | |
| 6,918,113 B2 * | 7/2005 | Patel et al. | ..................... | 717/178 |
| 6,959,320 B2 * | 10/2005 | Shah et al. | ..................... | 709/203 |
| 7,039,709 B1 * | 5/2006 | Beadle et al. | .................. | 709/227 |
| 7,430,640 B2 * | 9/2008 | Schmuck et al. | .............. | 711/137 |
| 7,680,797 B1 * | 3/2010 | Singh et al. | .................... | 709/229 |
| 7,899,996 B1 * | 3/2011 | Levin-Michael | ............. | 711/137 |
| 2003/0067872 A1 * | 4/2003 | Harrell et al. | .................. | 370/229 |
| 2003/0126232 A1 * | 7/2003 | Mogul et al. | ................... | 709/219 |
| 2003/0204673 A1 * | 10/2003 | Venkumahanti et al. | ..... | 711/137 |
| 2004/0216097 A1 * | 10/2004 | Sun | ....................... | G06F 12/121 717/154 |
| 2004/0268051 A1 * | 12/2004 | Berg et al. | ..................... | 711/137 |
| 2005/0028225 A1 * | 2/2005 | Dawson et al. | ............... | 725/146 |
| 2006/0174023 A1 * | 8/2006 | Horn et al. | ..................... | 709/231 |
| 2006/0174228 A1 * | 8/2006 | Radhakrishnan | ... | G06F 9/30047 717/127 |
| 2007/0106849 A1 * | 5/2007 | Moore et al. | .................. | 711/137 |
| 2007/0198780 A1 * | 8/2007 | Boyd et al. | ..................... | 711/137 |
| 2007/0214325 A1 * | 9/2007 | Sasamoto | ...................... | 711/137 |
| 2007/0255844 A1 * | 11/2007 | Shen et al. | ..................... | 709/231 |
| 2008/0022005 A1 * | 1/2008 | Wu et al. | ........................ | 709/231 |
| 2008/0127131 A1 * | 5/2008 | Gao | ....................... | G06F 8/4442 717/140 |
| 2008/0140997 A1 * | 6/2008 | Tripathi | ........................ | 712/207 |
| 2008/0244080 A1 * | 10/2008 | James et al. | ................... | 709/231 |

* cited by examiner

*Primary Examiner* — Philip Chea
*Assistant Examiner* — Wing Ma
(74) *Attorney, Agent, or Firm* — Campbell Stephenson LLP

(57) ABSTRACT

A method and apparatus for pre-fetching data to be streamed from a data storage to a user computer comprising the steps of determining information regarding a file type of a data file, establishing pre-fetch parameters in response to the information, accessing the data file and pre-fetching data blocks from the data file in accordance with the pre-fetch parameters is described.

16 Claims, 3 Drawing Sheets

METHOD AND APPARATUS FOR PREFETCHING DATA

BACKGROUND OF THE INVENTION

1. Field of the Invention

Embodiments of the present invention generally relate to prefetching computer files and, more specifically, to a method and apparatus for prefetching data for transmission to a user computer.

2. Description of the Related Art

Many users of the Internet subscribe to services such as "Storage On Demand" to augment the needs of data storage. In such services, users can obtain storage resources by purchasing the services of the online storage service provider. Most of the user's data stored in the online storage pools is multimedia data, for example movies, pictures and music files.

When multimedia files are played, they are streamed from the storage resources to the application, for example Windows Media Player, running on the user's computer. As the multimedia data file is accessed remotely through a computer network, for example, the Internet or a LAN and the like, latency in receiving the file contents may negatively affect the user's experience. Latency may be caused by a limited connection speed, available local storage, caching methods and similar reasons. Such latency causes discontinuities in the reception of data and gaps in presentation caused by these discontinuities are often experienced by the user. Conventional pre-fetching methods and caching methods provided by conventional file systems have been insufficient to remedy such discontinuities. These methods also create undo transmission bandwidth burden upon the network. Inefficient caching and pre-fetching methods do not provide the user with a seamless data access, for example, a seamless music or movie playing experience.

Accordingly, there exists a need for a method and apparatus that improves the performance of data access from a data storage to a user computer.

SUMMARY

Embodiments of the present invention comprise a method and apparatus for pre-fetching data. In one embodiment, a method and apparatus for pre-fetching data to be streamed from a data storage to a user computer comprises determining information regarding a data file, establishing pre-fetch parameters in response to the information, accessing the data file and pre-fetching data blocks from the data file in accordance with the pre-fetch parameters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one", and the word "plurality" means one or more, unless otherwise mentioned.

DETAILED DESCRIPTION

Figure 1:
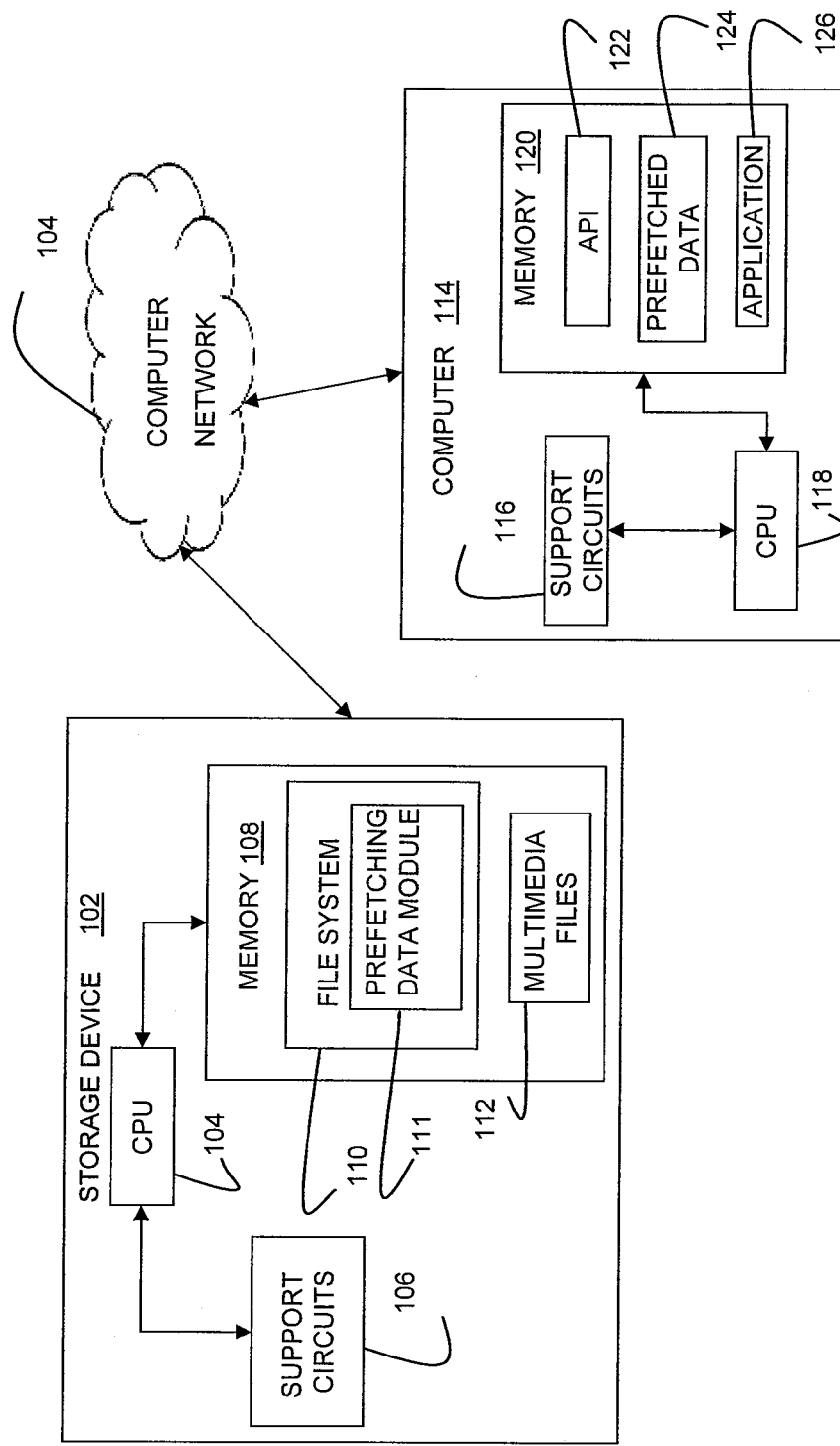
FIG. 1 is a block diagram illustrating an exemplary embodiment of a system for pre-fetching data from the storage devices in accordance with various embodiments of the present invention.

FIG. 1 illustrates a system 100 for pre-fetching data according to various embodiments of the present invention. The system 100 comprises of a storage device 102, a computer 114 and a computer network 104. The storage device 102 further comprises of a memory 108. The memory 108 may be removable storage such as optical disk, tape drive and the like, hard disk storage, or any combination of such memory devices. The storage device 102 also includes a CPU 104. The CPU 104 may include a microprocessor, instruction-set processor or like type processing element known in the art. The memory 108 is coupled to the CPU 104. The storage device 102 also comprises of support circuits 106. The support circuits 106 comprise circuits and devices that are used in support of the operation of the CPU 104. The support circuits 106 include, for example, cache, input/output circuits, system bus, data registers, power supplies and the like.

The memory 108 may be random access memory, read only memory, for example PROM, EPROM, EEPROM and the like, removable storage such as optical disk, tape drive and the like, hard disk storage, flash drives, and the like generally known in the art. The memory 108 further includes a file system 110, a pre-fetching module 111 and multimedia files 112. In one embodiment, the pre-fetching module 111 (e.g., a caching/pre-fetching layer) is included within the file system 110.

The computer 114 is coupled to the storage device 102 via a computer network 104. The computer network 104 may be a Local Area Network (LAN), Wide Area Network (WAN) or any such communications network known in the art for communicating data from one computer to another.

The computer 102 comprises a CPU 116, a memory 114 and support circuits 118. The CPU 116 may include a microprocessor, instruction-set processor or similar processor known in the art. The memory 114 may be random access memory, read only memory, for example PROM, EPROM, EEPROM and the like, removable storage such as optical disk, tape drive and the like, hard disk storage, flash drives, and the like generally known in the art. The memory 114 further comprises an application 126, for example Windows Media Player, and an Application Programming Interface (API) 122, for example Windows API or WinAPI. Generally, the application programming interface (API) 122 is a source code interface that an application such the application 126 uses to communicate with a control program such as operating system, data base management system (DBMS), communication protocols among various others. The memory 114 also includes pre-fetched data 124 for storing data pre-fetched from the storage device 112 through the API 122. The pre-fetched data 124 may include a complete data file or one or more data blocks of the specified data file. The support circuits 116 may include conventional cache, power supplies, clock circuits, data registers, I/O circuitry, and the like to facilitate operation of the computer 114. The support circuit 116 and the memory 114 are coupled to the CPU 118. Those skilled in the art will appreciate that the hardware depicted in the FIG. 1 may vary from one computer system to another. For example, other peripheral devices, such as optical disk drives, graphics card, data storage devices, various other input devices and the like, may also be used in addition to, or in place of the hardware depicted.

According to one embodiment, the application 126 when executed on the computer 114 communicates with the file system 110 within the storage device 102 through the API 122. The application 126 provides the necessary information related to the file type and/or file extension type, for example .jpg, .avi and the like, to the file system 110 through the API 122. In another embodiment, the API 122 instructs the pre-fetching module 111 included as the pre-fetching layer of the file system 110 to pre-fetch and cache the correct files or blocks of data to lessen or eliminate discontinuities when accessing the one or more files from the multimedia files 112. In one embodiment, the application 126 provides the necessary information related to a total number of files (e.g., a play list), an order in which the files are executed (e.g., a slide show), and/or their respective file extension/type to the file system 110 through the API 122. The API 122 also communicates with the pre-fetching module 111 regarding pre-fetching parameters that control various aspects of the pre-fetching process.

According to one or more embodiments, the pre-fetch parameters may be established in response to information regarding a download speed or a block fetching speed, a file extension/type, metadata characteristics of the file type, heuristic learning based on usage of the file, instructions from an API (e.g., the API 122 as used by the application 126) and the like as well as any combination of such approaches. In one embodiment, the pre-fetch parameters include pre-fetching in alphabetical order, numerical order, an order according to a play list or an order following instructions from the API.

The metadata contains the information related to a particular data file and is used to facilitate the understanding, use and management of data. Metadata varies with the type of data and context of use. For example, metadata about a computer file may include the name of the file, the type of file, file access dates and times and the name of the data administrator. The heuristic pertains to the process of gaining knowledge or some desired result by intelligent guess work rather than following a pre-established formula.

According to one or more embodiments of the present invention, the pre-fetch parameters are established based on information regarding the contents of the data file or metadata characteristics of the specific file type (e.g., underlying structure of the file type). Based on the information and/or the metadata characteristics, the pre-caching module 111 determines which and how many data blocks to pre-fetch. For example, .avi files have a known structure, and the application 126 within the computer 114 performs the following steps for accessing the .avi file (e.g., within the storage device 102) for reading: 1. open the block that contains a pointer to a pointer block; open the pointer block; and start playing the movie at the first block identified by the pointer block. The pre-fetching module 111 within the file system 110 establishes pre-fetch parameters based on this structure of the .avi file and pre-fetches data blocks from the .avi file in accordance with the pre-fetch parameters. In one embodiment, the pre-fetching module 111 uses the structure for the .avi for pre-fetching data blocks from another .avi at a later time (e.g., the next likely .avi file requested by the application 126). In either embodiment, the pre-fetched data blocks are ready for execution by the application 126 before the pre-fetched data blocks are needed (e.g., request) by the application 126. Then, the pre-fetched data blocks are consumed by the application 126 (e.g., displayed as streaming media).

Pre-fetching techniques may vary according to the file extension/type. In cases where multiple caching techniques are applicable for the specific file extension/type, the pre-fetching module 111 picks one of the techniques and records the success or failure of the particular pre-fetching inside some meta-data field of the file system 110. In cases of failure, the subsequent read accesses for the same file can be performed differently using different techniques while in the cases of success, the subsequent read access is performed in the same manner. Success is defined as the situation in which the file blocks are pre-fetched such that no read operation has to wait for the download.

In certain cases, due to a lack of prior knowledge of the underlying structure of the specific file extension/type, the pre-fetching performed by the caching/pre-fetching layer may not be effective. In such cases, the caching layer analyzes the read access pattern for the specific file extension/type. While opening the same data file or another data file of the same type at a later time, proper and effective pre-fetching is enabled for the pre-fetching module 111 based on the read access pattern.

According to another embodiment of the invention, the pre-fetching module 111 predicts the next file or data block likely to be accessed by the application 126 based on past access patterns. Examining the past access pattern helps the file system 110 to make a prediction the next likely data file or data block. Based on this prediction, the pre-fetching module 111 (e.g., included within the caching layer of the file system 110) pre-fetches data blocks from the data file. The pre-fetching module 111 then updates the prediction to reflect recent accesses. For example, in cases where the application is using a play list, the contents of the play list is examined by the pre-fetching module 111 so that proper pre-fetching can be performed at file boundaries.

Occasionally, media files are accessed sequentially (e.g., alphabetical order, chronological order, numerical order, and the like). Accordingly, the blocks associated with the particular media file are pre-fetched sequentially based on the arrangement of the data blocks of the particular media file within the file system 110 and the memory 108. For example, alphabetical-based pre-fetching is utilized to pre-fetch the data files in alphabetical order of their respective file names. Alphabetical-based pre-fetching may be advantageous when the application executes (e.g., views, plays, and the like) the data files in alphabetical order, such as a collection of images, videos, or audio files. In one embodiment, alphabetical-based pre-fetching may sort the file names by their American Standard Code for Information Interchange (ASCII) codes. That is, if 001.jpg is viewed first then it is likely that 002.jpg is viewed next and so on and forth.

According to another embodiment of the invention, the pre-fetching module 111 determines certain factors in order to compute a number of data blocks to pre-fetch (i.e. read ahead from memory 108), pre-fetches the number of data blocks, and then, releases one or more data blocks (e.g. pre-fetched and non pre-fetched) of the data file read from the memory 108 (e.g., transmits the pre-fetched data blocks to the application 126). The factors may include effective download speed (A), bit rate/size of media (B) and length of play (C). From these three values, an amount (X) of data blocks to read ahead needed before releasing any of the data blocks of the data file is determined. X can be determined as $X=B-(A*C)$. X is then multiplied by a safety factor to ensure seamless experience. If X<0, a certain amount of pre-fetching is required before releasing any of the data blocks read from the data file.

The application 126 cooperates with the API 122 in instructing the file system 110 to pre-fetch data from multimedia files 112. The pre-fetched data blocks are communicated to the computer 114 and stored (cached) in the pre-fetched data 124 included in the memory 120. The application 126 collects and reads the pre-fetched multimedia data from the pre-fetched data 124 in lieu of receiving a data stream directly from the computer network 104.

According to another embodiment of the invention, the pre-fetched data blocks once consumed by the application 126 may be discarded when pure sequential access is used by the application 126. This helps in keeping the cache clean. However, in some cases, a certain amount of blocks may be kept in the cache (e.g., in memory 120) to allow a user to scroll back a few seconds in the movie or music file. Such caching provides for better responsiveness of the application.

In one embodiment, the application 126 is configured to execute (e.g., play) files in a play list. The play list may include a catalogue of music tracks that helps the user in organizing and managing various music files on the application, for example the application 126 installed on the computer 114. The tracks included in the play list are required to be played in some specified order. The application 126 sends this information to the file system, for example the file system 110 through the API 122. Based on the information received from the API 122, the file system 110 pre-fetches the tracks according to one of the various embodiments of pre-fetching the data, as disclosed. After pre-fetching the data related to the tracks, the tracks are cached in the memory 120 in the computer 114 (e.g., cached in the pre-fetched data 124). While the application 126 plays a particular track from the play list, the API 122 instructs the pre-fetching module 111 within the file system 110 to pre-fetch the file containing the next track as specified in the play list, from the storage device 102 and store the pre-fetched file in the pre-fetched data 124 for faster access. Before the application 126 finishes playing the first track, the API 122 instructs the file system 110 to pre-fetch the file containing the next track, stores the file in the pre-fetched data 124 and provides the track to the application 126. The pre-fetching module 111 helps the application 126 avoid jerks and discontinuities in executing the pre-fetched files, such as the pre-fetched music files, thereby creating a seamless user experience.

Figure 2:
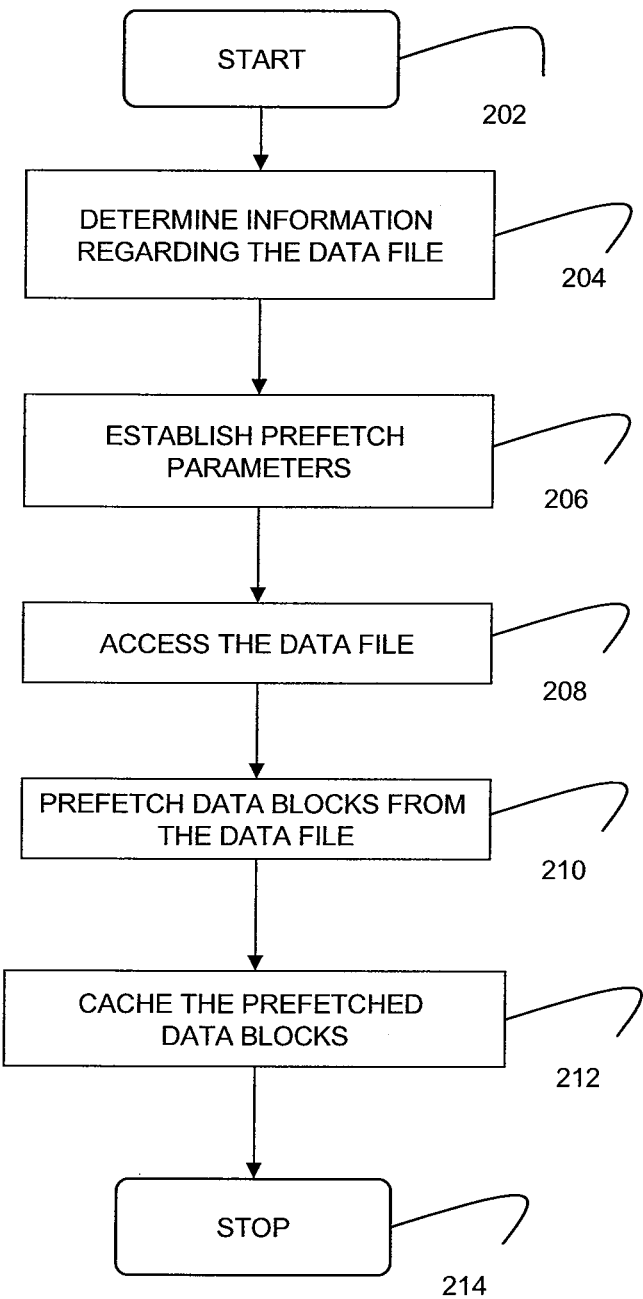
FIG. 2 is a flow diagram illustrating an exemplary embodiment of a method for pre-fetching data from storage device according to various embodiments of the present invention.

FIG. 2 is a flow diagram illustrating a method 200 for pre-fetching data from data storage to a user computer according to an embodiment of the invention. The method 200 starts at step 202 and proceeds to step 204 wherein information related to the data file to be executed (e.g., by the application 126) is determined or gathered by the pre-fetching module 111 and relayed to the file system 110, included in the memory 108 of the storage device 102. At step 206, pre-fetch parameters, as discussed above, are established for pre-fetching the data file. The data file is then accessed in step 208 by the pre-fetching module 111. At step 210, data blocks from the data file are pre-fetched. At step 212, the pre-fetched data blocks are cached. In one embodiment, the pre-fetched data blocks are stored in the pre-fetched data 124, included in the memory 120 of the computer 114. In another embodiment, the application 126 collects the pre-fetched multimedia data from the pre-fetched data 124. The method ends at step 214.

Figure 3:
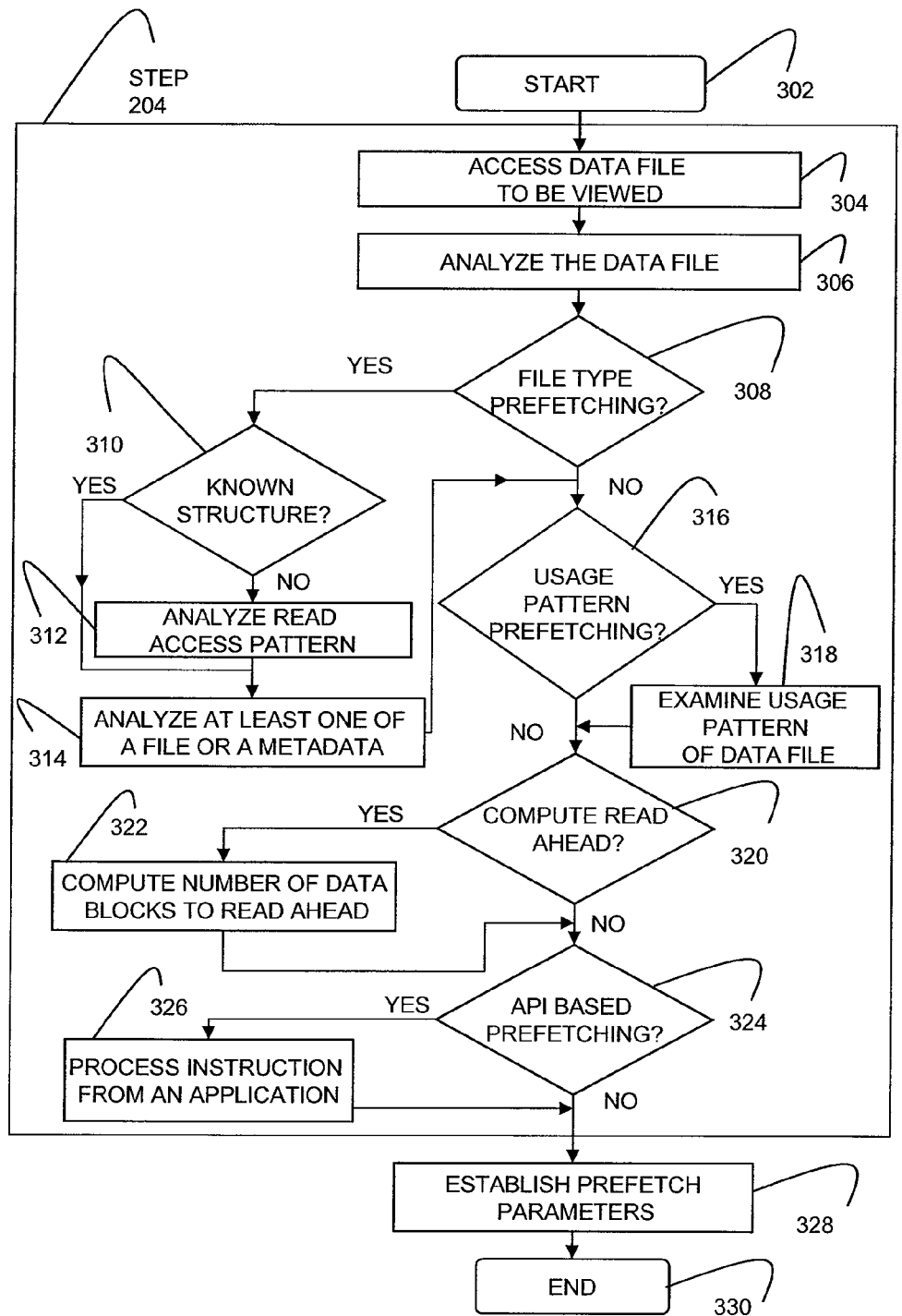
FIG. 3 is a flow diagram illustrating an exemplary embodiment of a method for establishing pre-fetch parameters according to various embodiments of the present invention.

FIG. 3 is a flow diagram illustrating a method 300 for determining information regarding a data file according to various embodiments of the present invention. In one embodiment, the method 300 illustrated in FIG. 3 is an elaboration of the step 204 of FIG. 2. The method 300 starts at step 302 and proceeds to step 304 where the data file to be viewed is accessed by the pre-fetching module 111. At step 306, the data file is analyzed for information that can used to establish pre-fetch parameters. In one or more embodiments, the method 300 also performs any combination of file type/extension based pre-fetching, usage based pre-fetching, API based pre-fetching or pre-fetching by computing a number of data blocks to read ahead as illustrated by steps 308 to 326 in order to determine information that can be used to establish pre-fetch parameters.

At step 308, a determination is made as to whether to perform file type/extension based pre-fetching. If the file type/extension based pre-fetching is to be performed (option "YES"), then the method 300 proceeds to step 310 at which, a determination is made as to whether to the data file has a known structure, as described above. If the data file does not have a known structure (option "NO"), then the method 300 proceeds to step 312. At step 312, a read access pattern for the file type/extension is analyzed, as described above. If the data file has a known structure (e.g., an .avi file) (option "YES"), then the method 300 proceeds to step 314. At step 314, at least one of the contents or metadata of the data file is analyzed. If the file type/extension based pre-fetching is not to be performed (option "NO"), then the method 300 proceeds to step 316.

At step 316, a determination is made as to whether to perform file usage pattern based pre-fetching If the file usage pattern based pre-fetching is to be performed (option "YES"), then the method 300 proceeds to step 318 where a usage pattern of the data file is examined. As a result, the pre-fetching module 111 within the file system 110 can now predict the next data file and/or data block likely to be pre-fetched for the application 126 from the past usage patterns. If the file usage pattern based pre-fetching is not to be performed (option "NO"), the method proceeds to step 320.

At step 320, a determination is made as to whether to compute a number of data blocks from the data file to read ahead. If the number of data blocks to read ahead is to be computed (option "YES"), then the method 300 proceeds to step 322, at which the number of data blocks is computed using certain factors, as described above. If the number of data blocks to read ahead is not to be computed (option "NO"), then the method 300 proceeds to step 324.

At step 324, a determination is made as to whether to perform API based pre-fetching. If the API based pre-fetching is to be performed (option "YES"), then the method 300 proceeds to step 326. At step 326, instructions from the application (e.g., application 126) through the API (e.g., the API 122) is processed. In one embodiment, the pre-fetching module 111 processes the instructions as part of the information needed to establish the pre-fetch parameters. If the API based pre-fetching is not to be performed (option "NO"), then the method 300 proceeds to step 328.

At step 328, the pre-fetch parameters are established based on the information gathered from the steps above. For example, if the information shows that the data file is one picture from an album, then the pre-fetch parameters would instruct the pre-fetching module to pre-fetch the picture files in alphabetical order because such files are normally viewed alphabetically. As another example, if the information provides the number of data blocks to read ahead for a movie file, then the pre-fetch parameters would instruct the pre-fetching module to pre-fetch at least that number of data blocks in order to provide a seamless playing experience for that movie file. The method 300 ends at step 330.

Those skilled in the art will appreciate that various embodiments of the present invention are not only applicable to online storage, but may be used in various scenarios in which multimedia files are stored on a storage device having a slower access speed than the local disk drive. The local disk drive may include one or more storage devices coupled to the user's computer. For example, embodiments of the present invention may be applied advantageously to any file stored in a hierarchical system. The blocks in the file may be pre-fetched from the slower media to the faster media.

Further, although various embodiments of the present invention have been illustrated with respect to multimedia files, those skilled in the art will readily appreciate the application of the various embodiments to other files, and all such embodiments are also included within the scope and spirit of the invention defined by the appended claims.

Certain embodiments of the invention may be used advantageously in "Online Video on Demand" like services where an API may access more data from pre-fetch cache located in the remote storage. Moreover, since online storage is becoming more and more prevalent, various embodiments as discussed herein provide for creating a seamless user experience while accessing online storages.

The present invention, in its various embodiments, advantageously provides for pre-fetching the data where the data is streamed from data storage to a user computer in an effective and fast manner. Various embodiments of the present invention advantageously provide for methods and systems to establish pre-fetch parameters based on the information related to the file type.

While the foregoing is directed to embodiments of the present invention, other and further embodiments of the invention may be devised without departing from the basic scope thereof, and the scope thereof is determined by the claims that follow.

The invention claimed is:

1. A method for pre-fetching data, the method comprising:
ascertaining, using a computer, information regarding a data file, wherein the ascertaining
    comprises
    accessing a download speed of a network connection, a bit rate, a file size of the data file, and a length of play, and
    computing a number of data blocks of the data file to buffer, wherein the computing is performed, at least in part, by multiplying the download speed with the length of play to calculate an intermediate result, and subtracting the intermediate result from the file size, and
    the number of data blocks is greater than zero;
providing, using the computer, the information to an application programming interface (API);
in response to receiving the information, using the API to establish a first set of pre-fetch parameters, wherein
    the first set of pre-fetch parameters comprises at least two of alphabetical order, numerical order, an order according to a play list, and an order following instructions from the API,
    the first set of pre-fetch parameters is established in accordance with a first pre-fetch technique, and
    the first pre-fetch technique is chosen from a plurality of pre-fetch techniques,
attempting to pre-fetch one or more of a plurality of data blocks via a network from the data file using the computer in accordance with the first set of pre-fetch parameters, wherein
    the data file comprises the plurality of data blocks;
determining whether the attempting is successful;
in response to a determination that the attempting was unsuccessful, establishing a second set of pre-fetch parameters
wherein
    the second set of pre-fetch parameters comprises at least two of alphabetical order, numerical order, an order according to a play list, and an order following instructions from the API,
    the second set of pre-fetch parameters is not identical to the first set of pre-fetch parameters,
    the second set of pre-fetch parameters is established in accordance with a second pre-fetch technique, and
    the second pre-fetch technique is chosen from the plurality of pre-fetch techniques using the API; and
pre-fetching, using the computer, one or more of the plurality of data blocks from the data file, wherein
    the pre-fetching is performed in accordance with either the first set of pre-fetch parameters or the second set of pre-fetch parameters, and
    the pre-fetching is performed via the network;
accessing the data file using the computer, wherein
    the data file is stored on a storage device, and
    the storage device is communicatively coupled to the computer via a network; and
buffering the one or more pre-fetched data blocks, wherein
    the buffering comprises storing the one or more pre-fetched data blocks in a memory on the computer.

2. The method of claim 1, wherein the ascertaining the information regarding the data file further comprises
    determining second information regarding a file type of the data file,
    in response to a determination of the file type, determining one or more pointers of the data file, wherein
    each of the one or more pointers points to one or more of the plurality of data blocks.

3. The method of claim 2, wherein
    the ascertaining the information further comprises analyzing at least one of a content or a metadata of the data file, and
    the pre-fetching the one or more data blocks in accordance with the first set of pre-fetch parameters comprises
    accessing one or more respective data blocks of the one or more data blocks pointed to by each of the one or more pointers.

4. The method of claim 3, wherein the step of ascertaining the information further comprises determining a read access pattern for the file type.

5. The method of claim 1, wherein the step of ascertaining the information further comprises examining a usage pattern for the data file.

6. An apparatus for pre-fetching data, comprising:
a storage device comprising a data file, wherein
the data file comprises a plurality of data blocks;
a file system used by an application for accessing the data file via a network;
an application programming interface (API) for
receiving, via the network, information describing the data file, wherein the information comprises a download speed of a network connection, a bit rate, a file size of the data file, and a length of play, and
the information is used to compute a number of data blocks of the data file to buffer, wherein
the number is computed, at least in part, by multiplying the download speed with the length of play to calculate an intermediate result, and subtracting the intermediate result from the file size, and
the number is greater than zero;
in response to the receiving of the information, establishing a first set of pre-fetch parameters, wherein
the first set of pre-fetch parameters comprises at least two of alphabetical order, numerical order, an order according to a play list, and an order following instructions from the API,
the first set of pre-fetch parameters is chosen in accordance with a first pre-fetch technique, and
the first pre-fetch technique is chosen from a plurality of pre-fetch techniques;
attempting to pre-fetch at least one of the plurality of data blocks via the network, wherein
the attempting comprises attempting to pre-fetch the at least one of the plurality of data blocks using the first set of pre-fetch parameters;
determining whether the attempting is successful;
in response to a determination that the attempting was unsuccessful, establishing a second set of pre-fetch parameters, wherein
the second set of pre-fetch parameters comprises at least two of alphabetical order, numerical order, an order according to a play list, and an order following instructions from the API,
the second set of pre-fetch parameters is not identical to the first set of pre-fetch parameters,
the second set of pre-fetch parameters is chosen in accordance with a second pre-fetch technique, and
the second pre-fetch technique is chosen from the plurality of pre-fetch techniques using the API;
a pre-fetching module, implemented by a processor, coupled to the file system for
pre-fetching, using the network, one or more of the plurality of data blocks from the data file in accordance with either the first set of pre-fetch parameters or the second set of pre-fetch parameters; and
a buffer for storing the one or more pre-fetched data blocks, wherein the application accesses the one or more pre-fetched data blocks from the buffer.

7. The apparatus of claim 6, wherein the pre-fetching module is further for
determining second information regarding a file type of the data file, and in response to a determination of the file type,
determining one or more pointers of the data file, wherein each of the one or more pointers points to one or more respective data blocks of the plurality of data blocks.

8. The apparatus of claim 6, wherein the pre-fetching module processes instructions from the application for pre-fetching the data file through the API.

9. The apparatus of claim 7, wherein the pre-fetching module is further for analyzing at least one of a content or a metadata of the data file, and is configured to perform the pre-fetching of the data blocks in accordance with the second set of pre-fetch parameters by accessing one or more respective data blocks of the plurality of data blocks pointed to by each of the one or more pointers.

10. The apparatus of claim 6, wherein the pre-fetching module examines a usage pattern for the data file.

11. A system for pre-fetching data, comprising:
a user computer comprising:
an application for
requesting a data file stored on a storage device, wherein the data file comprises a plurality of data blocks, and the storage device is communicatively coupled to the user computer via a network,
determining information regarding the data file, wherein the information comprises a download speed of a network connection, a bit rate, file size of the data file, and a length of play,
computing a number of data blocks of the data file to buffer, wherein
the computing is performed, at least in part, by multiplying the download speed with the length of play to calculate an intermediate result, and subtracting the intermediate result from the file size, and
the number of data blocks is greater than zero;
an application programming interface (API) for
establishing a first set of pre-fetch parameters, wherein
the first set of pre-fetch parameters comprises at least two of alphabetical order, numerical order, an order according to a play list, and an order following instructions from the API,
the first set of pre-fetch parameters is established in accordance with a first pre-fetch technique, and
the first pre-fetch technique is chosen from a plurality of pre-fetch techniques,
attempting to pre-fetch one or more of the plurality of data blocks from the data file,
using the user computer in accordance with the first set of pre-fetch parameters,
determining whether the attempting is successful,
in response to a determination that the attempting was unsuccessful,
establishing a second set of pre-fetch parameters, wherein the second set of pre-fetch parameters comprises at least two of alphabetical order, numerical order, an order according to a play list, and an order following instructions from the API,
the second set of pre-fetch parameters is not identical to the first set of pre-fetch parameters,
the second set of pre-fetch parameters is established in accordance with a second pre-fetch technique, and
the second pre-fetch technique is chosen from the plurality of pre-fetch techniques using the API;
a storage device for transmitting the data file to the user computer comprising: a file system used by the application for accessing the data file;
a pre-fetching module, implemented by a processor, coupled to the file system for
pre-fetching at least one of the plurality of data blocks from the data file in accordance with either the first set of pre-fetch parameters or the second set of pre-fetch parameters; and a buffer for storing the one or more pre-fetched data blocks, wherein the application is configured to access the one or more pre-fetched data blocks from the buffer.

12. The system of claim 11, wherein the application is a multimedia application for executing multimedia files.

13. The method of claim 1, further comprising recording the failure of the first set of pre-fetch parameters such that subsequent accesses of the data file can be performed using an alternate set of pre-fetch parameters chosen in accordance with an alternate pre-fetch technique chosen from the plurality of pre-fetch techniques other than the first pre-fetch technique.

14. The method of claim 1, further comprising in response to the establishing of the first set of pre-fetch parameters, associating the first set of pre-fetch parameters with a file type of the data file; and in response to the establishing of the second set of pre-fetch parameters, disassociating the first set of pre-fetch parameters with the file type, and associating the second set of pre-fetch parameters with the file type.

15. The method of claim 14, further comprising: determining, using the computer, other information regarding an other data file;

providing, using the computer, the other information to the application programming interface;

determining whether the other data file is of the file type; and in response to a determination that the other data file is of the file type, establishing the second set of pre-fetch parameters using the application programming interface, wherein the second set of pre-fetch parameters is established in accordance with the first pre-fetch technique.

16. The method of claim 1, further comprising playing the data file on the computer, wherein the playing comprises displaying a plurality of the pre-fetched data blocks; retaining in the buffer, after the playing, a subset of the pre-fetched data blocks, wherein the subset is sufficient to scroll back a predetermined amount of time during the playing; and discarding, after the playing, one or more of the pre-fetched data blocks that are not among the subset.

\* \* \* \* \*